United States Patent
Shen et al.

(10) Patent No.: US 8,781,021 B2
(45) Date of Patent: Jul. 15, 2014

(54) METHOD AND DEVICE FOR PRE-CODING, AND METHOD AND DEVICE FOR DECODING

(75) Inventors: Hui Shen, Shenzhen (CN); Bin Li, Shenzhen (CN); Yi Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/525,641

(22) Filed: Jun. 18, 2012

(65) Prior Publication Data

US 2012/0250780 A1     Oct. 4, 2012

Related U.S. Application Data

(63) Continuation of application No. PCT/CN2010/079972, filed on Dec. 18, 2010.

(30) Foreign Application Priority Data

Dec. 18, 2009    (CN) .......................... 2009 1 0259455

(51) Int. Cl.
    *H04B 15/00*        (2006.01)
    *H04B 7/04*        (2006.01)
    *H04L 25/03*        (2006.01)

(52) U.S. Cl.
    CPC ........ *H04B 7/0413* (2013.01); *H04L 25/03343* (2013.01); *H04B 7/0465* (2013.01)
    USPC ............ 375/285; 375/295; 375/296; 375/316

(58) Field of Classification Search
    CPC ...... H04B 3/32; H04B 3/23; H04L 25/03343; H04L 25/497; H04L 25/03057
    USPC .................................. 375/285, 295, 296, 316
    See application file for complete search history.

(56) References Cited

U.S. PATENT DOCUMENTS

2012/0128083 A1     5/2012    Ren

FOREIGN PATENT DOCUMENTS

| CN | 101242381 | 8/2008 |
|---|---|---|
| CN | 101471712 | 7/2009 |
| CN | 101854234 | 10/2010 |
| EP | 1578024 | 9/2005 |
| GB | 2469081 | 10/2010 |
| JP | 2013-502109 | 1/2013 |

OTHER PUBLICATIONS

Daofeng Xu, "Linear Transceiver Design for Multiuser MIMO downlink", 2008 IEEE.*

(Continued)

*Primary Examiner* — Dhaval Patel
(74) *Attorney, Agent, or Firm* — Staas & Halsey LLP

(57) ABSTRACT

The present invention relates to the field of wireless communications technologies, and discloses a method and device for pre-coding and a method and device for decoding. The present invention implements an interference alignment method with excellent performance, can effectively increase the capacity of a multi-user interference system and reduce the mutual interference among users, The method for pre-coding includes: calculating a pre-coding matrix for each transmitting end according to a sum of mean square errors of data vectors to be transmitted by each transmitting ends; and using the pre-coding matrix to pre-code the data to be transmitted by each transmitting end. The present invention has broad application prospects, for example, can be used in LTE and LTE-Advanced CoMP technology.

14 Claims, 7 Drawing Sheets

(56) References Cited

OTHER PUBLICATIONS

First Chinese Office Action issued Aug. 27, 2012 in corresponding Chinese Patent Application No. 200910259455.4.
Xu Dao-feng et al., "Linear Transceiver Design for Multiuser MIMO Downlink", Journal of Electronics & Information Technology, vol. 31, No. 2, Feb. 2009, pp. 405-409.
International Search Report, mailed Mar. 31, 2011, in corresponding International Application No. PCT/CN2010/079972 (4 pp.).
Syed A. Jafar et al., "Degrees of Freedom for the MIMO Interference Channel," Proceedings of the ISIT, 2006, pp. 1-6.
Steven W. Peters et al., "Interference Alignment Via Alternating Minimization", Proceedings of the ICASSP, 2009, pp. 1-5.
Krishna Gomadam et al., "Approaching the Capacity of Wireless Networks through Distributed Interference Alignment", IEEE Transactions on Information Theory, vol. 57, No. 6, Jun. 2011, pp. 1-10.
Natasha Devroye et al., "The Multiplexing Gain of MIMO X-Channels with Partial Transmit Side-Information", International Symposium on Information Theory, Jun. 2007 pp. 1-5.
Syed A. Jafar et al., "Degrees of Freedom Region for the MIMO X Channel", IEEE Trans. Inform. Theory, vol. 54, Jan. 2008, pp. 151-170.
Viveck R. Cadambe et al., "Interference Alignment and Spatial Degrees of Freedom for the K User Interference Channel", IEEE Transactions on Information Theory, vol. 54, No. 8, Aug. 2008, pp. 1-30.
Viveck Cadambe et al., "Interference Alignment on the Deterministic Channel and Application to Fully Connected AWGN Interference Networks", arXiv:0711.2547v1 [cs.IT], Nov. 2007, pp. 1-5.
Viveck R. Cadambe et al., "Interference Alignment and Degrees of Freedom of the K-User Interference Channel", IEEE Transactions on Information Theory, vol. 54, No. 8, Aug. 2008, pp. 3425-3441.
Tiangao Gou et al., "Degrees of Freedom of the K User M×N MIMO Interference Channel", Proceedings of the 28th IEEE conference on Global telecommunications, 2009, pp. 1-28.
Sriram Sridharan et al., "A Layered Lattice Coding Scheme for a Class of Three User Gaussian Interference Channels", Allerton Conference on Communication, Control, and Computing, Sep. 2008, pp. 1-8.
Roland Tresch et al., "Cellular Interference Alignment with Imperfect Channel Knowledge", Proceedings of the ICC, 2009, pp. 1-4.
Raul Etkin et al., "On the Degrees-of-Freedom of the K-User Gaussian Interference Channel", IEEE Transactions on Information Theory, vol. 55, Issue 11, pp. 1-29.
Jatin Thukral et al., "Interference Alignment with Limited Feedback", ISIT, 2009, pp. 1759-1763.
International Search Report mailed Mar. 31, 2011 issued in corresponding International Patent Application No. PCT/CN2010/079972.
Written Opinion of the International Searching Authority mailed Mar. 31, 2011 issued in corresponding International Patent Application No. PCT/CN2010/079972.
Schmidt, D. et al., *Minimum Mean Square Error Vector Precoding*, 2005 IEEE 16th International Symposium on Personal, Indoor and Mobile Radio Communications, pp. 107-111.
Extended European Search Report, dated Jan. 7, 2013, in corresponding European Application No. 10837058.6 (5 pp.).
Office Action, dated Feb. 5, 2013, in corresponding Chinese Application No. 200910259455.4 (43 pp.).
Hui Shen et al., "A Robust Interference Alignment Scheme for the MIMO X Channel"; Proceedings of the 15th Asia-Pacific Conference on Communications on Oct. 10, 2009 (APCC 2009)—056; pp. 241-244.
Xuzhen Wang et al., "Iterative MMSE Precoding for MIMO Interference Channel"; Wireless Communications, Networking and Mobile Computing, 2009. WiCom '09, 5th International Conference, Sep. 24-28, 2009; pp. 1-4.
Jinfan Zhang et al., "Joint Linear Transmitter and Receiver Design for the Downlink of Multiuser MIMO Systems"; IEEE Communications Letters, vol. 9, No. 11, Nov. 2005; pp. 991-993.
Hui Shen et al., "MSE-Based Transceiver Designs for the MIMO Interference Channel"; IEEB Transactions on Wireless Communications, vol. 9, No. 11, Nov. 2010; pp. 3480-3489.
Japanese Office Action mailed Jul. 16, 2013 in corresponding Japanese Patent Application No. 2012-543461 (3 pages) (3 pages English Translation).

* cited by examiner

METHOD AND DEVICE FOR PRE-CODING, AND METHOD AND DEVICE FOR DECODING

CROSS-REFERENCE TO RELATED APPLICATIONS

This application is a continuation of International Application No. PCT/CN2010/079972, filed on Dec. 18, 2010, which claims priority to Chinese Patent Application No. 200910259455.4, filed on Dec. 18, 2009, both of which are hereby incorporated by reference in their entireties.

FIELD OF THE INVENTION

The present invention relates to the field of wireless communications technologies, and in particular, to a method and device for pre-coding, and a method and device for decoding.

BACKGROUND OF THE INVENTION

In a wireless communication system, mutual interference exists among signals of different users, and in a Gaussian interference channel, each user knows respective complete channel information, but data of different users cannot be shared, so joint transmission cannot be performed. As shown in FIG. 1, a Gaussian interference channel of two users is shown, and interference exists between users $x_1$ and $x_2$. How to improve the capacity of the Gaussian interference channel when eliminating the interference among the users is always one of main bottlenecks limiting the development of the technology.

A conventional solution of avoiding mutual interference among users in an interference channel adopts orthogonalization, such as a time division multiple address (TDMA) technology and a frequency division multiple address (FDMA) technology. As shown in FIG. 2, a schematic diagram of a TDMA system is shown. In the TDMA system, different users send data at different time, thereby avoiding mutual interference among the users. Similar to the TDMA system, in the FDMA system, different users send data at different frequencies, thereby also avoiding mutual interference among the users.

In view of the defects in the conventional solution, along with the intensive study on the Gaussian interference channel, a method for solving mutual interference among users by using interference alignment is proposed. The interference alignment refers to that, in the situation of knowing complete channel information, through preprocessing of a transmitting end, a useful signal and an interference signal of each receiving end are separated in space, and the interferences of different transmitting ends to the receiving end are all aligned to the same spatial dimension, thereby avoiding the influence of the interference and achieving the objective of improving the capacity. The research on the capacity of the Gaussian interference channel and the interference alignment are still in a primary stage, so the method of interference alignment is currently a hotspot in researching.

The prior art provides an example of interference alignment in a special channel. As shown in FIG. 3, the special channel includes K transmitting ends and K receiving ends. A channel response of each transmitting end to a target receiving end is 1, and an interference channel of each transmitting end to all users is correspondingly i, and if a transmission signal is a real part of a signal space, a receiving signal at a $k^{th}$ receiving end is:

$$r_k = s_k + i \sum_{l=1, l \neq K}^{K} s_l + n_k \quad (1)$$

Obviously, the receiving end can detect the transmission signal only by directly obtaining the real part of the receiving signal, that is, $$\mathrm{Re}(r_k) = \mathrm{Re}\left(s_k + i \sum_{l=1, l \neq K}^{K} s_l + n_k\right) = \mathrm{Re}(s_k + n_k) \quad (2)$$

It can be seen that, although the transmission signal losses a half of the signal space, the interference among the users is eliminated.

In the prior art, a method of explicit interference alignment (Explicit IA) is further provided, and in the situation that three users have the same antenna, the Explicit IA method includes constructing the following relationship in a column space (C) first:

$$c(H^{(12)}V^{(2)})=c(H^{(13)}V^{(3)}),$$

$$c(H(H^{(21)}V^{(1)})=c(H^{(23)}V^{(3)}),$$

$$c(H^{(31)}V^{(1)})=c(H^{(32)}V^{(2)}).$$

where, $H^{(ij)}$ represents a channel coefficient matrix from a transmitter j to a receiving end i. $V^{(i)}$ represents a pre-coding matrix of a transmitting end i. The following expressions may be obtained according to the foregoing formula:

$$E=(H^{(31)})^{-1}H^{(32)}(H^{(12)})^{-1}H^{(13)}(H^{(23)})^{-1}H^{(21)},$$

$$F=(H^{(32)})^{-1}H^{(31)} \text{ and } G=(H^{(23)})^{-1}H^{(21)},$$

Therefore, the matrix constructed by using the first half eigenvector of the matrix E as a row vector is used as a pre-coding matrix $V^{(1)}$ of a transmitting end 1; and pre-coding matrices $V^{(2)}$ and $V^{(3)}$ of a transmitting end 2 and a transmitting end 3 are obtained respectively as follows:

$$V^{(2)}=FV^{(1)}, V^{(3)}=GV^{(1)}$$

During the implementation of the present invention, the inventor finds that the prior art at least has the following problem: the conventional orthogonalization solution such as TDMA and FDMA results in an excessively low capacity of the system, which is only 1/K log(SNR)+o(log(SNR)), thereby limiting the throughput of the system. As for the conventionally provided interference alignment method, it is only applicable to a certain special channel, the special channel is difficult to be constructed and can hardly be implemented, and the method has high bit error rate and poor performance.

SUMMARY OF THE INVENTION

In order to solve the problems in the prior art, embodiments of the present invention provide a method and device for pre-coding and a method and device for decoding, which are capable of improving the capacity of a multi-user interference system and reducing the mutual interference among users.

In order to achieve the objects, embodiments of the present invention adopt the following technical solutions:

A method for pre-coding includes:

calculating a pre-coding matrix for each transmitting end according to a sum of mean square errors of data vectors to be transmitted by each transmitting end; and using the pre-coding matrix to pre-code the data to be transmitted by each transmitting end.

A method for decoding includes:

receiving data from a transmitting end, where the data is pre-coded by using a pre-coding matrix; and using a decoding matrix to decode the received data, so as to obtain a valid signal;

where, the decoding matrix and the pre-coding matrix are obtained by calculating according to a sum of mean square errors of data vectors to be transmitted by each transmitting end.

A device for pre-coding includes:

a calculation unit, configured to calculate a pre-coding matrix for each transmitting end according to a sum of mean square errors of data vectors to be transmitted by each transmitting end; and a pre-coding unit, configured to use the pre-coding matrix obtained by the calculation unit to pre-code the data to be transmitted by each transmitting end.

A device for decoding includes:

a receiving unit, configured to receive data from a transmitting end, where the data is pre-coded by using a pre-coding matrix; and a decoding unit, configured to use a decoding matrix to decode the data received by the receiving unit, so as to obtain a valid signal, where the decoding matrix and the pre-coding matrix are obtained by calculating according to a sum of mean square errors of data vectors to be transmitted by each transmitting end.

In the technical solutions provided in the embodiments of the present invention, the pre-coding matrix of each transmitting end is calculated according to the sum of mean square errors of data vectors to be transmitted by each transmitting end, and through joint design of the pre-coding matrix of each transmitting end and the decoding matrix of each receiving end, an interference alignment method with better performance is implemented, thereby avoiding the mutual interference among users in an interference channel. The technical solutions in the embodiments of the present invention are not limited to a certain special channel, and dramatically improve the capacity of the system while avoiding the interference among the users. Moreover, the experiment proved that, the present invention is capable of effectively reducing the interference among the users, and greatly reducing the bit error rate of the system.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are some embodiments of the present invention, and persons skilled in the art may derive other drawings from the accompanying drawings without creative efforts.

DETAILED DESCRIPTION OF THE EMBODIMENTS

The technical solution of the present invention is to be clearly and described in the following with reference to the accompanying drawings. It is obvious that the embodiments to be described are a part rather than all of the embodiments of the present invention. All other embodiments obtained by persons skilled in the art based on the embodiments of the present invention without creative efforts shall fall within the protection scope of the present invention.

An embodiment of the present invention mainly provides a new interference alignment method for joint iteration of a multiple input multiple output (MIMO) interference channel. The technical solution, in the situation that transmitters do not share data, through a joint design of the pre-coding matrix of each transmitting end and the receiving beam forming filter of each receiving end, implements an interference alignment method with better performance, thereby avoiding the mutual interference among users in an interference channel. The technical solution of the embodiment of the present invention is not limited to a certain special channel, but has broad application prospects, for example, it can be applied in technologies such as a long term evolution network (LTE) and an LTE advanced network (LTE-Advanced) CoMP. The experiment proved that the method provided in the present invention is capable of effectively reducing the interference among users, and greatly reducing the bit error rate (BER) of the system.

Figure 1:
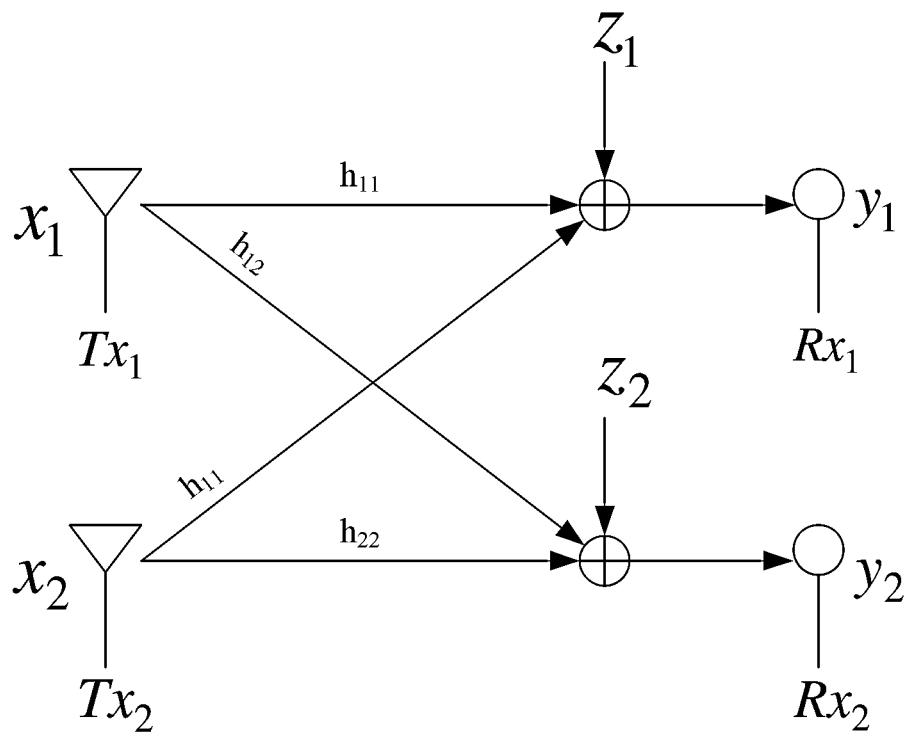
FIG. 1 is a schematic diagram of a Gaussian interference channel of two users in the prior art.
Figure 2:
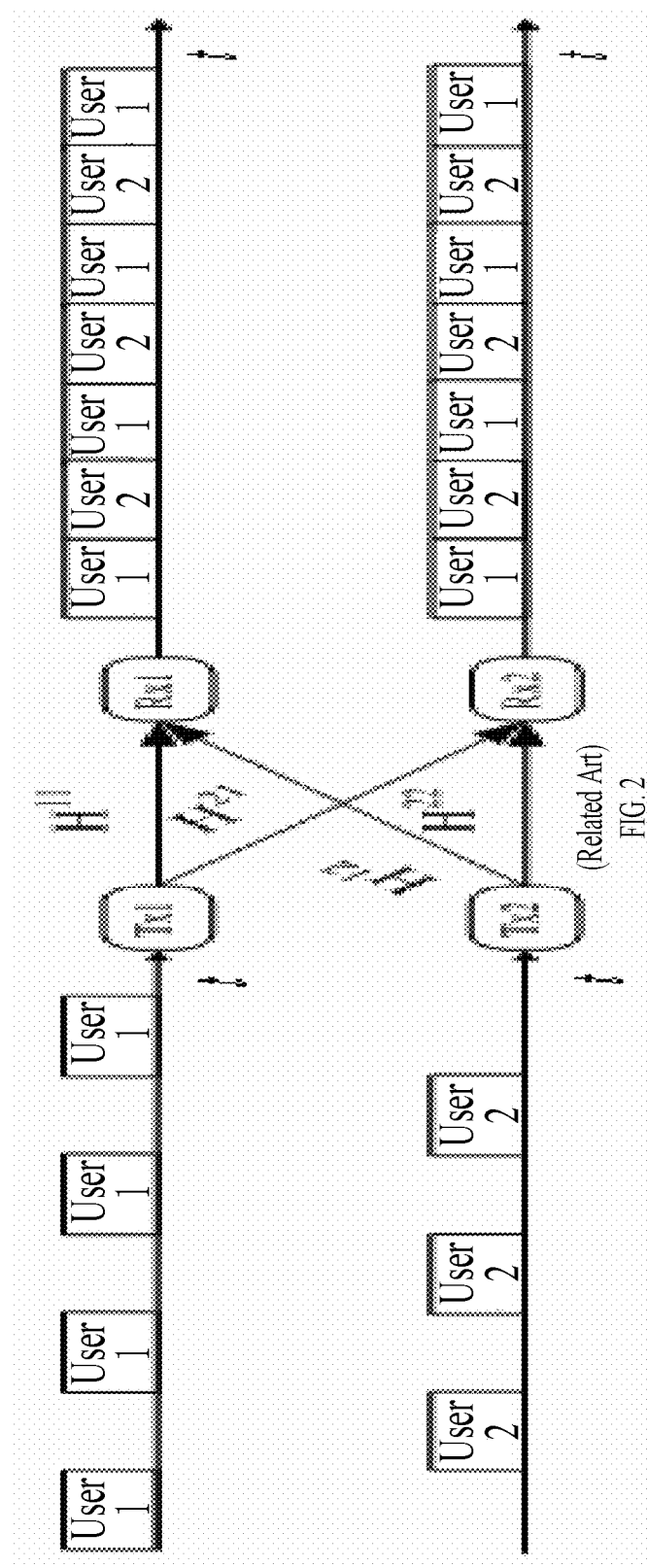
FIG. 2 is a schematic diagram of a TDMA system in the prior art.
Figure 3:
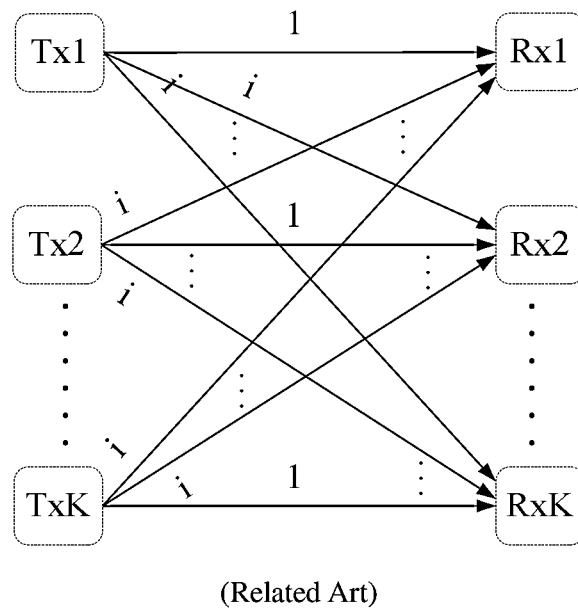
FIG. 3 is a schematic diagram of performing interference alignment in a special channel in the prior art.
Figure 4:
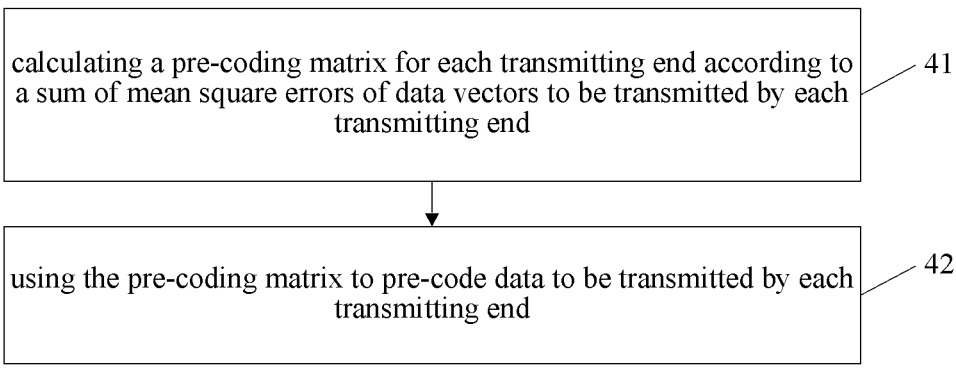
FIG. 4 is a schematic flow chart of a method for pre-coding provided in Embodiment 1 of the present invention.

A method for pre-coding provided in Embodiment 1 of the present invention is shown in FIG. 4, which includes:

Step 41: Calculate a pre-coding matrix for a transmitting end according to a sum of mean square errors of data vectors to be transmitted by each transmitting end; and Step 42: Use the pre-coding matrix to pre-code the data to be transmitted by each transmitting end.

Further, in order to ensure that, after the transmitting end uses the pre-coding matrix to pre-code the data, a receiving end is capable of detect a useful signal by using a corresponding decoding matrix, and the pre-coding matrix and the corresponding decoding matrix (also referred to as a receiving filter matrix) of the receiving end may all be required to enable the sum of mean square errors of data vectors to be transmitted by all transmitting ends to reach a minimum value. Or, it is required that a product of the sum of mean square errors of data vectors to be transmitted by each transmitting end and a weight factor reaches a minimum value, where the weight factor may be a non-linear factor or a linear factor, and is used to perform adjustment on the sum of mean square errors. Alternatively, according to a minimum value of a sum of or a difference between the sum of mean square errors of data vectors to be transmitted by each transmitting end and a bias parameter, the bias parameter may be a non-linear factor or a linear factor, and is used to perform adjustment on the sum of mean square errors.

In this embodiment, after performing pre-coding and related processing on the data by using the pre-coding matrix, it is ensured that when the receiving end detects a valid signal by using a corresponding decoding matrix, the valid signal is spatially separated from the interference signal, thereby avoiding the mutual interference among users in a channel. The experiment proved that, the embodiment of the present invention is capable of achieving a desired effect, and dramatically reducing the bit error rate.

Figure 5:
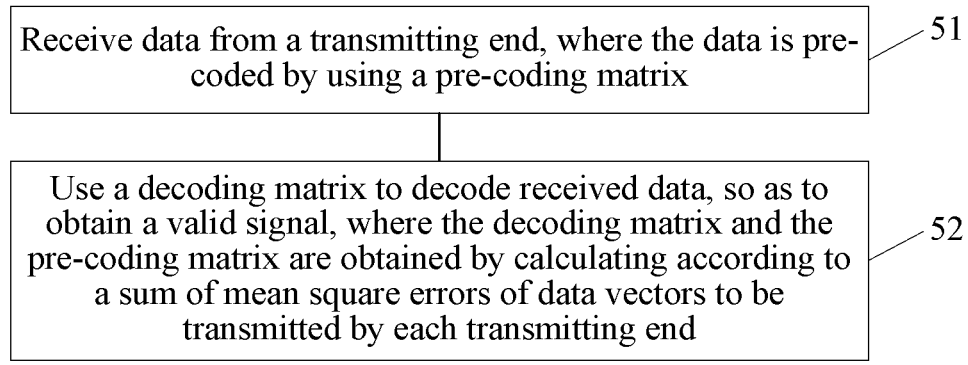
FIG. 5 is a schematic flow chart of a method for decoding provided in Embodiment 2 of the present invention.

A method for decoding provided in Embodiment 2 of the present invention is shown in FIG. 5, which includes:

Step 51: Receive data from a transmitting end, where the data is pre-coded by using a pre-coding matrix; and Step 52: Use a decoding matrix to decode received data, so as to obtain a valid signal, where the decoding matrix and the pre-coding matrix are obtained by calculating according to a sum of mean square errors of data vectors to be transmitted by each transmitting end.

In the Embodiment 2 of the present invention, the receiving end performs detection on the received data by using the decoding matrix, so as to spatially separate the valid signal and the interference signal, thereby avoiding the mutual interference among users in the channel. The experiment proved that the embodiment of the present invention is capable of achieving the desired effect.

A method for pre-coding provided in Embodiment 3 is illustrated in detail as follows.

Figure 6:
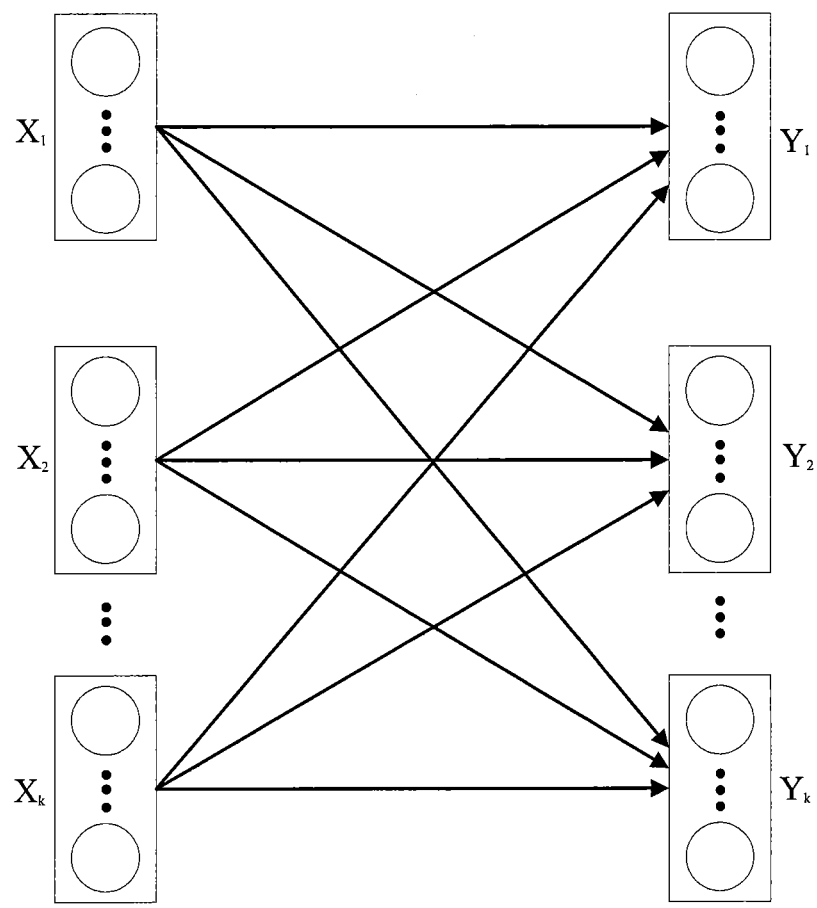
FIG. 6 is a schematic diagram of an MIMO interference system having K users provided in Embodiment 3 of the present invention.

In order to clearly illustrate the technical solution of the embodiment of the present invention, the embodiment of the present invention is illustrated by taking an example of an MIMO interference system having K users shown in FIG. 6.

FIG. 6 shows an interference system having K users, and the system has K transmitting ends and K receiving ends at the same time. The transmitting end may be one of a base station (NB), an enhanced base station (eNB) and a relay station (Relay NodeB), or a combination of the above. The number of antennas of a $k^{th}$ transmitting end is $M_k$, the number of antennas of a $k^{th}$ receiving end is $N_k$, the transmitting end k sends $D_k$ streams to a corresponding user k, and the power of the transmitting end k is $P_k$, where k is a label. An equation of the system may be expressed as follows:

$$Y_k = \sum_{l=1}^{K} H_{kl} X_l + n_k = \sum_{l=1}^{K} H_{kl} v_l d_l + n_k$$

$$= H_{kk} v_k d_k + \sum_{l \neq k} H_{kl} v_l d_l + n_k \quad k \in \{1, ..., K\}$$

where, $X_l$ is a signal (pre-coded signal) transmitted by a transmitting end 1; $Y_k$ is a receiving signal vector of the receiving end k, $n_k$ is a noise vector of Additive White Gaussian Noise (AWGN), $v_k$ is a $M_k \times D_k$ pre-coding matrix of the transmitting end k, $H_{kl}$ represents a channel coefficient matrix from the transmitting end 1 to the receiving end k; and $d_k$ represents a data vector to be transmitted by the transmitter k. The total power of the $l^{th}$ transmitter is $E[\|X_l\|^2]=P_l$.

Figure 7:
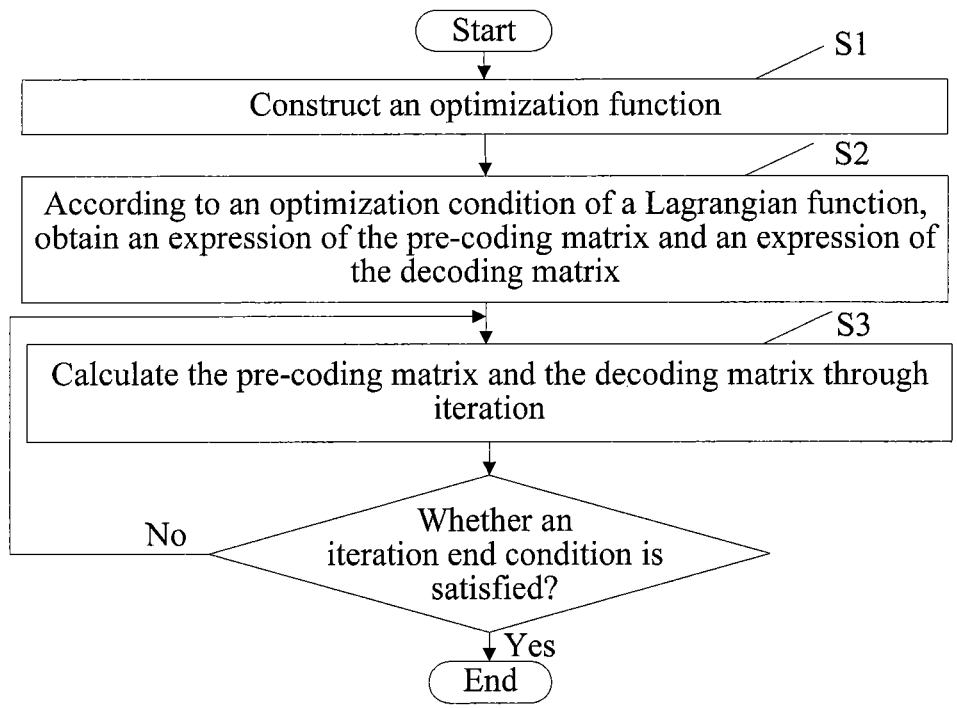
FIG. 7 is a schematic diagram of an iterative algorithm provided in Embodiment 3 of the present invention.

In the embodiment of the present invention, the sum of mean square errors of the data vectors to be transmitted by transmitting ends is used as a target optimization function, and the optimization is expressed as follows when calculating the pre-coding matrix:

$$\min_{v_k, R_k} \sum_{k=1}^{K} MSE_k$$

$$s.t. \quad tr(v_k^H v_k) = P_k \quad k \in \{1, \cdots, K\}$$

where, $MSE_k$ is a mean square error of the data vector to be transmitted by the transmitting end k, and $P_k = tr(v_k^H v_k)$ represents the transmission power constraint of the transmitting end k. In the embodiment of the present invention, as shown in FIG. 7, the calculating the pre-coding matrix includes the following steps:

Step S1: Construct an optimization function;

In this embodiment, a corresponding Lagrangian function is constructed according to the sum of mean square errors of the data vectors to be transmitted by the transmitting ends and the corresponding transmission power constraint of the transmitting ends. Specifically, the pre-coding matrix of each transmitting end is calculated according to a minimum value of the sum of mean square errors of the data vectors to be transmitted by each transmitting end and the corresponding transmission power constraint of the transmitting ends; or, the pre-coding matrix of each transmitting end is calculated according to a minimum value of the product of the sum of mean square errors of the data vectors to be transmitted by each transmitting end and a weight factor, and the corresponding transmission power constraint of the transmitting ends; or, the pre-coding matrix of each transmitting end is calculated according to a minimum value of a sum of or a difference between the sum of mean square errors of the data vectors to be transmitted by each transmitting end and a bias parameter, and the corresponding transmission power constraint of the transmitting ends. The weight factor or bias parameter may be linear or non-linear, and the weight factor or bias parameter is used to perform adjustment on the sum of mean square errors of the data vectors to be transmitted by the transmitting ends.

When the pre-coding matrix of each transmitting end is calculated according to a minimum value of the sum of mean square errors of the data vectors to be transmitted by each transmitting end and the corresponding transmission power constraint of the transmitting ends, the specific process includes the following two manners:

Manner 1: Minimum mean square error interference alignment (MMSE-IA) manner

The optimization function as shown in the following may be constructed:

$$L(v_k; R_k; \lambda_k) = \sum_{k=1}^{K} MSE_k + \sum_{k=1}^{K} \lambda_k [tr(v_k^H v_k) - P_k] \quad (1)$$

where, $v_k$ is a pre-coding matrix of the transmitting end k, $R_k$ is a decoding matrix of the receiving end k, the transmission power constraint of the transmitting end k is expressed as $P_k = tr(v_k^H v_k)$, $\lambda_k$ is a Lagrangian multiplier corresponding to the transmission power constraint of the transmitting end k, $MSE_k$ is a mean square error of the data vector to be transmitted by the transmitting end k, K represents the number of the transmitting ends or receiving ends, and k is a sequence number of a transmitting end.

Manner 2: Robust minimum mean square error interference alignment (Robust MMSE-IA) manner When the error of the channel is taken into consideration, the optimization function as shown in the following may be constructed:

$$L(v_k; R_k; \lambda_k) = \sum_{k=1}^{K} MSE_k \left( \hat{H}_{ij} \right) + \sum_{k=1}^{K} \lambda_k [tr(v_k^H v_k) - P_k] \quad (2)$$

where, $v_k$ is a pre-coding matrix of the transmitting end k, $R_k$ is a decoding matrix of the receiving end k, the transmission power constraint of the transmitting end k is expressed as $P_k = tr(v_k^H v_k)$, $\lambda_k$ is a Lagrangian multiplier corresponding to the transmission power constraint of the transmitting end k, $MSE_k|\hat{H}_{ij})$ an is a mean square error of the data vector to be transmitted by the transmitting end k, $\hat{H}_{ij} = H_{ij} + e_{ij}$ is an estimated value of a channel coefficient matrix from a transmitting end j to a receiving end i, $H_{ij}$ is the channel coefficient matrix from the transmitting end j to the receiving end i, $e_{ij}$ is an estimated error of the channel coefficient matrix from the transmitting end j to the receiving end i, K represents the number of the transmitting ends or receiving ends, and k, i and j are sequence numbers. Compared with the Robust MMSE-IA, the manner in the manner 1 may also be referred to as a conventional minimum mean square error interference alignment (conventional MMSE-IA).

Here, an average value of $e_{ij}$ is zero, and a mean square deviation of the channel estimated error is $\sigma_h^2$.

In an actual system, the transmitting end often cannot obtain the precise information of channel state, and when constructing the optimization function by using the formula (2), a robust interference alignment method is provided, which is capable of more effectively avoiding the mutual interference among the users, and reducing the influence of imprecise channel state information.

Step S2: According to an optimization condition of the Lagrangian function, obtain expressions of the pre-coding matrix and the decoding matrix:

Here, a KKT (Karush-Kuhn-Tucker) condition is used as the optimization condition of the Lagrangian function, and the KKT condition may be expressed as follows:

$$\frac{\partial L}{\partial v_k^*} = 0, k \in \{1, \cdots, K\};$$

$$\frac{\partial L}{\partial R_k^*} = 0, k \in \{1, \cdots, K\};$$

$$\frac{\partial L}{\partial \lambda_k} = 0, k \in \{1, \cdots, K\};$$

According to the KKT condition, when using the optimization function shown in (1), the expressions of the pre-coding matrix and the decoding matrix as shown as follows are obtained:

$$v_k = \left( \sum_{i=1}^{K} H_{ik}^H R_i^H R_i H_{ik} + \lambda_k I \right)^{-1} H_{kk}^H R_k^H \quad k \in \{1, \cdots, K\} \quad (3)$$

$$R_k = v_k^H H_{kk}^H \left( \sum_{i=1}^{K} H_{ki} v_i v_i^H H_{ki}^H + \sigma_n^2 I \right)^{-1} \quad k \in \{1, \cdots, K\} \quad (4)$$

where, $\sigma_n^2$ is a variance of Additive Gaussian White Noise, $H_{ik}$ is a channel coefficient matrix from the transmitting end k to the receiving end i, and i is a sequence number.

According to the KKT condition, when using the optimization function shown in (2), the expressions of the pre-coding matrix and the decoding matrix as shown as follows are obtained:

$$v_k = \left[ \sum_{i=1}^{K} \hat{H}_{ik}^H R_i^H R_i \hat{H}_{ik} + \lambda_k I + \sigma_h^2 tr \left( \sum_{i=1}^{K} R_i^H R_i \right) I \right]^{-1} \hat{H}_{kk}^H R_k^H \quad (5)$$

$$R_k = v_k^H \hat{H}_{kk}^H \left( \sum_{i=1}^{K} \hat{H}_{ki} v_i v_i^H \hat{H}_{ki}^H + \sigma_n^2 I + \sigma_h^2 I \right)^{-1} \quad (6)$$

where, $\sigma_n^2$ is a variance of Additive Gaussian White Noise, $\sigma_h^2$ is a mean square deviation of the channel estimated error, and $\sigma_h^2$ satisfies $E\{e_{ij} e_{ij}^H\} = \sigma_h^2 I$.

It can be seen from the above that, the pre-coding matrix $\{v_k\}$, k=1, ..., K of the transmitting end is expressed as a function of the decoding matrix $\{R_k\}$, j=1, ..., K of the receiving end; the decoding matrix $\{R_k\}$, j=1, ..., K of the receiving end is expressed as a function of the pre-coding matrix $\{v_k\}$, k=1, ..., K of the transmitting end, and therefore, the interference alignment is performed by using an iterative algorithm in this embodiment.

Step S3: Use the expressions of the pre-coding matrix and the decoding matrix and an initial value of the pre-coding matrix to calculate through iteration to obtain the pre-coding matrix and the decoding matrix. Specifically, the following processing is included:

Step S31: Set the initial value of the pre-coding matrix;

The pre-coding matrices of all the transmitting ends are initialized, $v_k$, k=1, ..., K, so that the initial value of the pre-coding matrix is obtained when the iterative algorithm is being executed. However, the present invention is not limited to this, the decoding matrices may also be initialized, the decoding matrix is updated continually by using the initial value of the decoding matrix, and subsequent iterative algorithm is executed. At this time, when the current iteration satisfies an iteration end condition, the updated decoding matrix in the current iteration needs to be used to calculate a required pre-coding matrix.

Step S32: According to the initial value of the pre-coding matrix, use the expression of the decoding matrix to calculate each decoding matrix;

In the expression of each decoding matrix, the variance of the Additive Gaussian White Noise $\sigma_n^2$ and the channel coefficient matrix H are known, and the decoding matrix may be obtained through calculation by using the initial value of the pre-coding matrix.

Step S33: Use a calculated decoding matrix to calculate to obtain the Lagrangian multiplier of the current iteration.

Step S34: According to the Lagrangian multiplier of the current iteration, update the pre-coding matrix.

According to the calculated Lagrangian multiplier $\lambda_k$ of the current iteration and the decoding matrix, an updated precoding matrix is obtained through recalculation, and the updated pre-coding matrix is used as the pre-coding matrix obtained in this iteration.

Step S35: Use the updated pre-coding matrix to replace the initial value of the pre-coding matrix, so as to iteratively calculate the pre-coding matrix.

The updated pre-coding matrix is used to replace the initial value of the pre-coding matrix in the step 31, the operations from step S31 to step S34 are repeated until the iteration end condition is satisfied, for example, the algorithm converges or a predetermined number of times of iteration is reached.

For example, when the number of times of iteration reaches a predetermined value (for example, 32), the operation is ended, and the pre-coding matrix and decoding matrix that are obtained in the current iteration are used as a final pre-coding matrix and decoding matrix; or When a bound norm of a difference between the pre-coding matrix obtained in the current iteration and the pre-coding matrix obtained in the previous iteration is less than a predetermined value, at this time, it indicates that the algorithm converges, and the pre-coding matrix and decoding matrix that are obtained in the current iteration are used as the final pre-coding matrix and decoding matrix; or When an absolute value of a difference between the sum of mean square errors of the transmitting ends that is obtained in the current iteration and the sum of mean square errors of the transmitting ends that is obtained in the previous iteration is less than a predetermined value, the pre-coding matrix and decoding matrix that are obtained in the current iteration are used as the final pre-coding matrix and decoding matrix.

At the transmitting end, the pre-coding matrix is used to pre-code the data to be transmitted by each transmitting end, and after corresponding processing is performed, the pre-coded data is sent.

The receiving end receives the data sent by the transmitting end, and the receiving end decodes the data by using the corresponding decoding matrix, so as to obtain a valid signal. In order to ensure that the receiving end can detect a high-quality valid signal by using the decoding matrix, in the embodiment of the present invention, the decoding matrix used by the receiving end is corresponding to the pre-coding matrix used by the transmitting end, for example, the decoding matrix and the pre-coding matrix all enable the sum of mean square errors of the data vectors to be transmitted by all the transmitting ends to reach a minimum value. At this time, the decoding matrix may be obtained through calculation by using the method in the step S3, for example, according to the initial value of the decoding matrix, the method in the step S1 is used to execute the subsequent iterative operation, and when the iteration ends, the decoding matrix obtained in the last update is used as the decoding matrix required by the receiving end.

It may be understood that, the receiving end may also use another decoding method to decode the signal, so as to detect the valid signal. For example, the receiving end uses a ZF receiving filter to decoding the signal, so as to detect the valid signal.

The receiving end may use a pre-configured decoding matrix as the decoding matrix used when detecting the signal, or, the receiving end calculates in real time the decoding matrix used when detecting the signal. For example, the receiving end uses the method as described in step S1 and step S2 to calculate the decoding matrix.

In the technical solutions provided in the embodiments of the present invention, the pre-coding matrix of each transmitting end is calculated according to the sum of mean square errors of data vectors to be transmitted by each transmitting end, and through joint design of the pre-coding matrix of each transmitting end and the decoding matrix of each receiving end, an interference alignment method with better performance is implemented, thereby avoiding the mutual interference among users in the interference channel. The technical solutions in the embodiments of the present invention are not limited to a certain special channel, and dramatically improve the capacity of the system while avoiding the interference among the users. Moreover, the experiment proved that, the present invention is capable of effectively reducing the interference among the users, and greatly reducing the bit error rate of the system.

The beneficial effects of the present invention are further illustrated through experimental data. In the experiment, an MIMO interference channel system having 3 users is adopted, that is, K=3; the number of transmitting antennas of each transmitting end is 4, that is $M_1=M_2=M_3=4$; the number of receiving antennas of each receiving end is 4, that is $N_1=N_2=N_3=4$; that is, the antenna configuration may be expressed as: {3; (4,4,4), (4,4,4)}. Each transmitting end transmits 2 streams, $D_1=D_2=D_3=2$, and is modulated by using QPSK.

Figure 8:
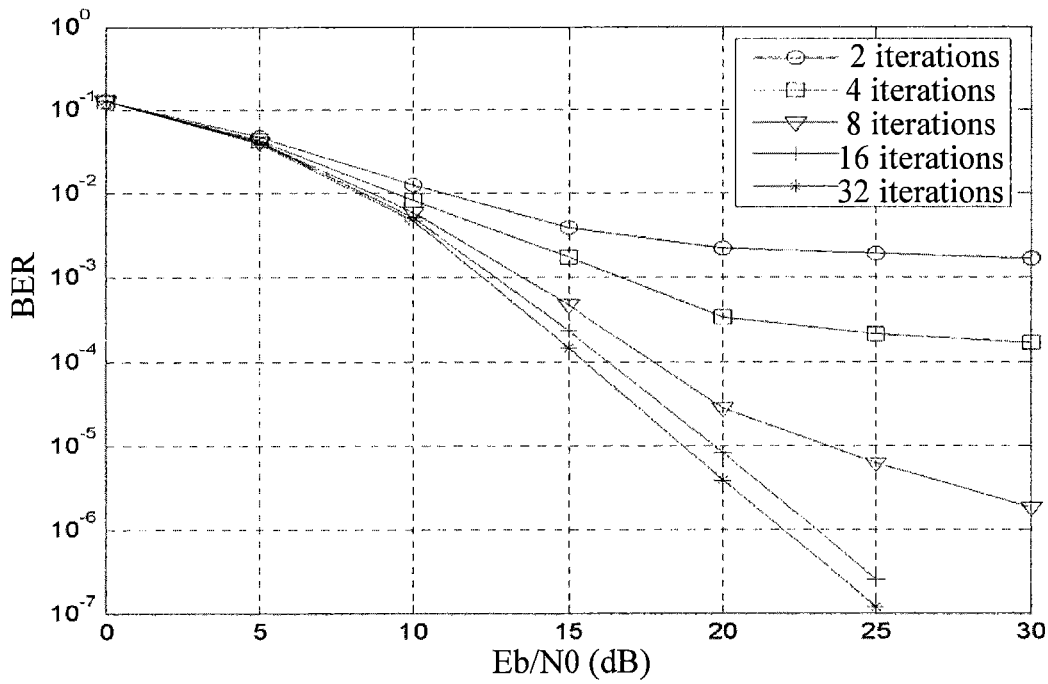
FIG. 8 is an experiment result diagram provided in an embodiment of the present invention.

FIG. 8 is an experiment result diagram provided in an embodiment of the present invention, and in FIG. 8, the horizontal axis represents the signal to noise ratio (Eb/N0), and the longitudinal axis represents the bit error rate. In FIG. 8, from top to bottom, the top one is a curve when the number of times of iteration is 2 (that is, a curve having circular marks), the next curve is a curve when the number of times of iteration is 4 (that is, a curve having square marks), the next curve is a curve when the number of times of iteration is 8 (that is, a curve having triangular marks), the next curve is a curve when the number of times of iteration is 16 (that is, a curve having cross marks), and the curve at the bottom is a curve when the number of times of iteration is 32 (that is, a curve having * marks). FIG. 8 shows that along with the increase of the number of times of iteration, the interference alignment method of the present invention greatly improves the bit error rate performance of the system.

Figure 9:
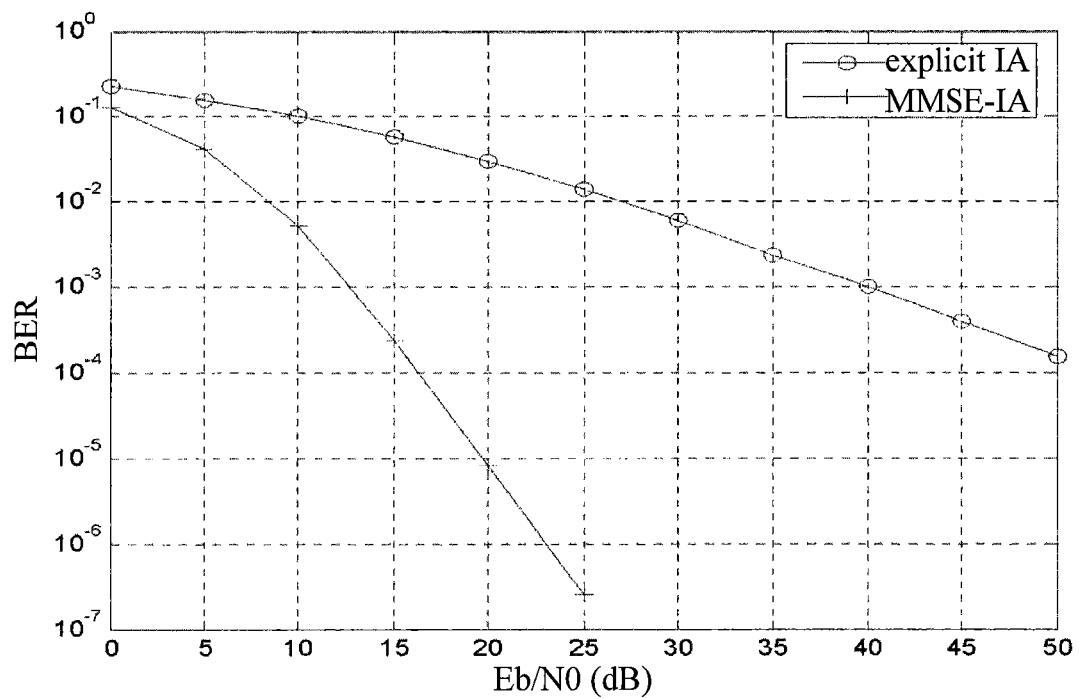
FIG. 9 is another experiment result diagram provided in an embodiment of the present invention.

FIG. 9 is an experiment result diagram provided in an embodiment of the present invention, and in FIG. 9, the horizontal axis represents the signal to noise ratio (Eb/N0), and the longitudinal axis represents the bit error rate. In FIG. 9, the situation of performing interference alignment by using the method for pre-coding (the selected number of times of iteration is 16) of the present invention is compared with the conventional explicit interference alignment (Explicit IA) method, the Explicit IA is shown by the curve having circular marks in the drawing, the interference alignment method (MMSE-IA) provided in the embodiment of the present invention is shown by the curve having cross marks in the drawing, and it may be seen that, the MMSE-IA method of the present invention greatly improves the bit error rate performance of the system.

Figure 10:
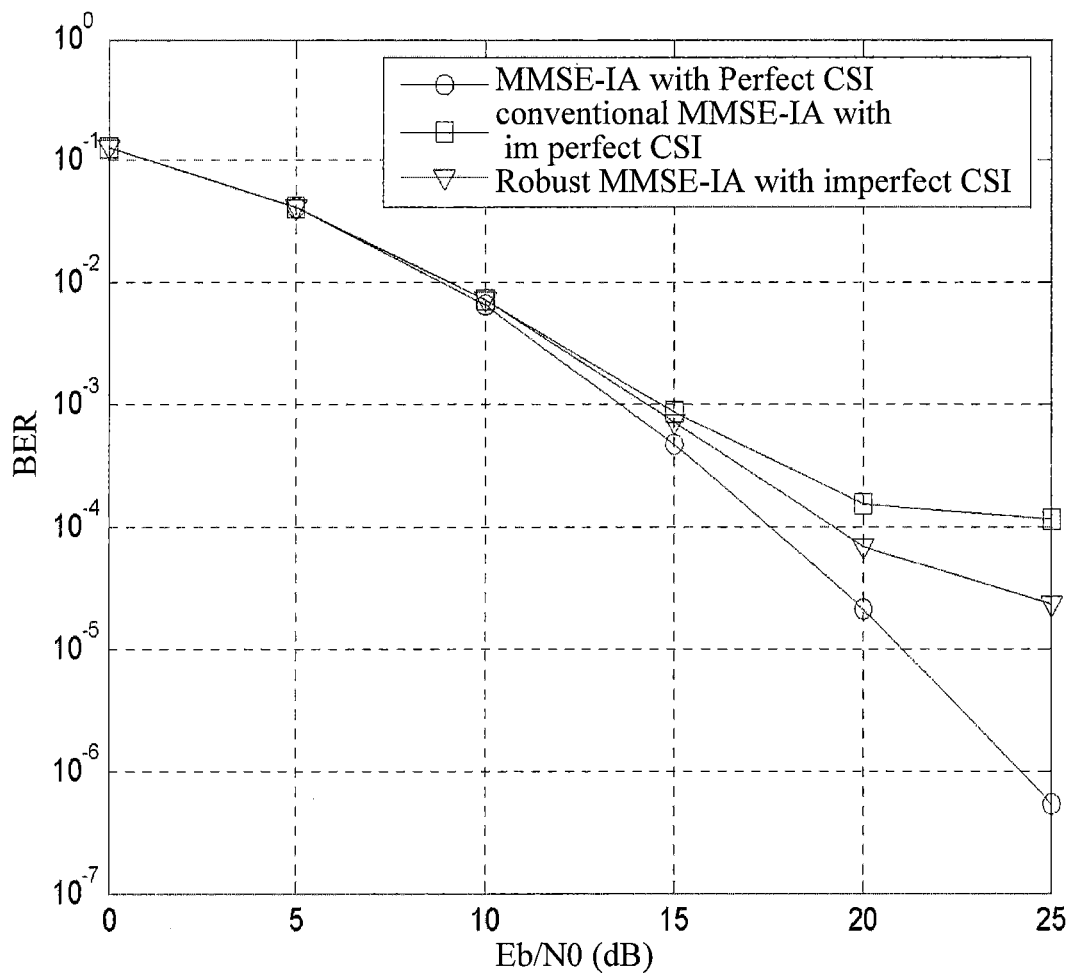
FIG. 10 is another experiment result diagram provided in an embodiment of the present invention.

FIG. 10 is an experiment result diagram provided in an embodiment of the present invention, and in FIG. 10, the horizontal axis represents the signal to noise ratio (Eb/N0), and the longitudinal axis represents the bit error rate. FIG. 10 shows comparison of experiment results when the MMSE-IA provided in the present invention is adopted in an ideal channel state (MMSE-IA with Perfect CSI), the MMSE-IA is adopted in a non-ideal channel state (conventional MMSE-IA with Perfect CSI), and the Robust MMSE-IA is adopted in a non-ideal channel state. It may be seen that, the Robust MMSE-IA method provided in the present invention is more robust for the error of the channel information.

Figure 11:
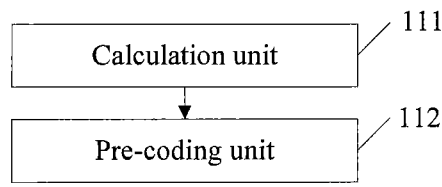
FIG. 11 is a schematic structural diagram of a device for pre-coding provided in an embodiment of the present invention.

An embodiment of the present invention further provides a device for pre-coding, and as shown in FIG. 11, the device includes:

a calculation unit 111, configured to calculate a pre-coding matrix for each transmitting end according to a sum of mean square errors of data vectors to be transmitted by each transmitting end; and a pre-coding unit 112, configured to use the pre-coding matrix obtained by the calculation unit 111 to pre-code the data to be transmitted by each transmitting end.

Further, the calculation unit 111 is configured to calculate the pre-coding matrix of each transmitting end according to a minimum value of the sum of mean square errors of the data vectors to be transmitted by each transmitting end; or, calculate the pre-coding matrix of each transmitting end according to a minimum value of the product of the sum of mean square errors of the data vectors to be transmitted by each transmitting ends and a weight factor; or, calculate the pre-coding matrix of each transmitting end according to a minimum value of a sum of or a difference between the sum of mean square errors of the data vectors to be transmitted by each transmitting ends and a bias parameter.

The calculation unit 111 includes:

an expression acquisition module, configured to construct a corresponding Lagrangian function according to the minimum value of the sum of mean square errors of the data vectors to be transmitted by each transmitting end, or according to the minimum value of the product of the sum of mean square errors of the data vectors to be transmitted by each transmitting end and a weight factor, or according to a minimum value of a sum of or a difference between the sum of mean square errors of the data vectors to be transmitted by each transmitting end and a bias parameter, and a corresponding transmission power constraint of the transmitting ends; and obtain an expression of the pre-coding matrix and an expression of the decoding matrix according to an optimization condition of the Lagrangian function; and an iteration module, configured to, by using the expressions of the pre-coding matrix and decoding matrix, which are obtained by the expression acquisition module, and an initial value of the pre-coding matrix, calculate through iteration to obtain the pre-coding matrix.

The expression acquisition module is further configured to construct the Lagrangian function as follows according to the minimum value of the sum of mean square errors of the data vectors to be transmitted by the transmitting ends and the corresponding transmission power constraint of the transmitting ends:

$$L(v_k; R_k; \lambda_k) = \sum_{k=1}^{K} MSE_k + \sum_{k=1}^{K} \lambda_k [tr(v_k^H v_k) - P_k]$$

where, $v_k$ is a pre-coding matrix of the transmitting end k, $R_k$ is a decoding matrix of the receiving end k, the transmission power constraint of the transmitting end k is expressed as $P_k = tr(v_k^H v_k)$, $\lambda_k$ is a Lagrangian multiplier, $MSE_k$ is a mean square error of the data vector to be transmitted by the transmitting k, K represents the number of the transmitting ends or receiving ends, and k is a sequence number.

According to the KKT condition of the Lagrangian function, the expression of the pre-coding matrix and the expression of the decoding matrix as follows are obtained:

$$v_k = \left(\sum_{i=1}^{K} H_{ik}^H R_i^H R_i H_{ik} + \lambda_k I\right)^{-1} H_{kk}^H R_k^H \quad k \in \{1, \cdots, K\}$$

$$R_k = v_k^H H_{kk}^H \left(\sum_{i=1}^{K} H_{ki} v_i v_i^H H_{ki}^H + \sigma_n^2 I\right)^{-1} \quad k \in \{1, \cdots, K\}$$

where, $H_{ik}$ is the channel coefficient matrix from the transmitting end k to the receiving end i, and i is a sequence number; or When the channel information obtained by the transmitting end has errors, the expression acquisition module is further configured to construct the Lagrangian function as follows according to the minimum value of the sum of mean square errors of the data vectors to be transmitted by the transmitting ends and the corresponding transmission power constraint of the transmitting ends:

$$L(v_k; R_k; \lambda_k) = \sum_{k=1}^{K} MSE_k\left(\hat{H}_{ij}\right) + \sum_{k=1}^{K} \lambda_k [tr(v_k^H v_k) - P_k]$$

where, $v_k$ is a pre-coding matrix of the transmitting end k, $R_k$ is a decoding matrix of the receiving end k, $P_k = tr(v_k^H v_k)$, $\lambda_k$ is a multiplier, $MSE_k(\hat{H}_{ij})$ is a mean square error of the data vector to be transmitted by the transmitting end k, an estimated value of the channel coefficient matrix from the transmitting end j to the receiving end I is $\hat{H}_{ij} = H_{ij} + e_{ij}$, $H_{ij}$ is the channel coefficient matrix from the transmitting end j to the receiving end i, $e_{ij}$ is an estimated error of the channel coefficient matrix from the transmitting end j to the receiving end i, K represents the number of the transmitting ends or receiving ends, and k, i and j are sequence numbers;

According to the KKT condition of the Lagrangian function, the expression of the pre-coding matrix and the expression of the decoding matrix as follows are obtained:

$$v_k = \left[\sum_{i=1}^{K} \hat{H}_{ik}^H R_i^H R_i \hat{H}_{ik} + \lambda_k I + \sigma_h^2 tr\left(\sum_{i=1}^{K} R_i^H R_i\right) I\right]^{-1} \hat{H}_{kk}^H R_k^H$$

$$R_k = v_k^H \hat{H}_{kk}^H \left(\sum_{i=1}^{K} \hat{H}_{ik} v_i v_i^H \hat{H}_{ki}^H + \sigma_n^2 I + \sigma_h^2 I\right)^{-1}$$

where, $\sigma_h^2$ is a mean square deviation of the channel estimated error, and $\sigma_h^2$ satisfies $E\{e_{ij} e_{ij}^H\} = \sigma_h^2 I$.

Further, the iteration module is configured to: according to the initial value, use the expression of the decoding matrix to calculate each decoding matrix; use the calculated decoding matrix to calculate to obtain a Lagrangian multiplier of the current iteration; update the pre-coding matrix according to the Lagrangian multiplier of the current iteration; replace the initial value of the pre-coding matrix with the updated pre-coding matrix, and calculate the pre-coding matrix through iteration.

Specific working manners of the functional modules and units in the device embodiments of the present invention may be obtained with reference to method embodiments of the present invention. Each functional module and unit in the device embodiments of the present invention may be implemented separately, and may also be implemented by being integrated in one or more units.

In the technical solutions provided in the embodiments of the present invention, the pre-coding matrix of the transmitting ends are calculated according to the sum of mean square errors of data vectors to be transmitted by each transmitting end, and through joint design of the pre-coding matrix of each transmitting end and the decoding matrix of each receiving end, an interference alignment method with better performance is implemented, thereby avoiding the mutual interference among users in the Gaussian interference channel. The technical solutions in the embodiments of the present invention are not limited to a certain special channel, and dramatically improve the capacity of the system while avoiding the interference among the users. Moreover, the experiment proved that, the present invention is capable of effectively reducing the interference among the users, and greatly reducing the bit error rate of the system.

Figure 12:
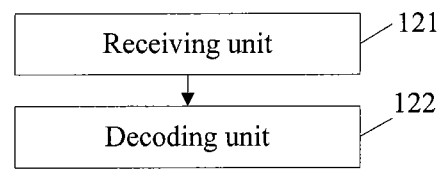
FIG. 12 is a schematic structural diagram of a device for decoding provided in an embodiment of the present invention.

An embodiment of the present invention further provides a device for decoding, and as shown in FIG. 12, the device includes:

a receiving unit 121, configured to receive data from a transmitting end, where the data is pre-coded by using a pre-coding matrix; and a decoding unit 122, configured to use a decoding matrix to decoding the data received by the receiving unit 121, so as to obtain a valid signal, where the pre-coding matrix and the decoding matrix are obtained by calculating according to a sum of mean square errors of data vectors to be transmitted by each transmitting end.

When the decoding matrix and the pre-coding matrix are obtained through calculation according to the minimum value of the sum of mean square errors of the data vectors to be transmitted by each transmitting end and the corresponding transmission power constraint of the transmitting ends, the decoding unit 122 is configured to use the decoding matrix having the following expression to decoding the data received by the receiving unit, so as to obtain the valid signal;

$$R_k = v_k^H H_{kk}^H \left( \sum_{i=1}^{K} H_{ki} v_i v_i^H H_{ki}^H + \sigma_n^2 I \right)^{-1} \quad k \in \{1, \cdots, K\},$$

or

When the channel information obtained by the transmitting end has errors, and the decoding matrix and the pre-coding matrix are obtained through calculation according to the minimum value of the sum of mean square errors of the data vectors to be transmitted by each transmitting end and the corresponding transmission power constraint of the transmitting ends, the decoding unit 122 uses the decoding matrix having the following expression:

$$R_k = v_k^H \hat{H}_{kk}^H \left( \sum_{i=1}^{K} \hat{H}_{ki} v_i v_i^H \hat{H}_{ki}^H + \sigma_n^2 I + \sigma_h^2 I \right)^{-1}$$

where, $v_k$ is a pre-coding matrix of the transmitting end k, $R_k$ is a decoding matrix of the receiving end k, $H_{ki}$ is the channel coefficient matrix from the transmitting end i to the receiving end k, $\sigma_n^2$ is a variance of Additive Gaussian White Noise, $\sigma_h^2$ is a mean square deviation of the channel estimated error, $\sigma_h^2$ satisfies $E\{e_{ij} e_{ij}^H\} = \sigma_h^2 I$, and i is a sequence number.

The decoding matrix used by the decoding unit may be the decoding matrix pre-configured in the decoding unit, or, when the decoding matrix is required, the decoding unit directly calculates to obtain the decoding matrix.

Specific working manners of each functional module and unit in the device embodiments of the present invention may be obtained with reference to method embodiments of the present invention. Each functional module and unit in the device embodiments of the present invention may be implemented separately, and may also be implemented by being integrated in one or more units.

In the technical solutions provided in the embodiments of the present invention, the pre-coding matrix of each transmitting end is calculated according to the sum of mean square errors of data vectors to be transmitted by each transmitting end, and through joint design of the pre-coding matrix of each transmitting end and the decoding matrix of each receiving end, an interference alignment method with better performance is implemented, thereby avoiding the mutual interference among users in the interference channel. The technical solutions in the embodiments of the present invention are not limited to a certain special channel, and dramatically improve the capacity of the system while avoiding the interference among the users. Moreover, the experiment proved that, the present invention is capable of effectively reducing the interference among the users, and greatly reducing the bit error rate of the system.

It is clear to persons skilled in the art that the present invention may be accomplished through software plus a necessary universal hardware platform. Based on this understanding, the technical solution of the present invention or the part that makes contributions to the prior art may be substantially embodied in the form of a software product. The computer software product may be stored in the storage media, such as, a ROM/RAM, a magnetic disk, or an optical disk, and include several instructions configured to instruct computer equipment (for example, a personal computer, a server, or network equipment) to perform each embodiment of the present invention or the method described in some parts of the embodiment.

The foregoing descriptions are merely several embodiments of the present invention, but not intended to limit the present invention. Various variations and modifications made by persons skilled in the art without departing from the spirit of the present invention fall within the protection scope of the present invention. Therefore, the protection scope of the present invention is subject to the appended claims.

What is claimed is:

1. A method for pre-coding, comprising:
calculating a pre-coding matrix for each transmitting end according to a sum of mean square errors of data vectors to be transmitted by each transmitting end; and
using the pre-coding matrix to pre-code data to be transmitted by each transmitting end,
wherein the calculating of the pre-coding matrix comprises:
calculating the pre-coding matrix for each transmitting end according to a minimum value of the sum of mean square errors of data vectors to be transmitted by each transmitting end; or
calculating the pre-coding matrix for each transmitting end according to a minimum value of a product of the sum of mean square errors of data vectors to be transmitted by each transmitting end and a weight factor; or
calculating the pre-coding matrix for each transmitting end according to a minimum value of a sum of or a difference between the sum of mean square errors of data vectors to be transmitted by each transmitting end and a bias parameter, the sum of mean square errors of data vectors including an estimated error for a channel coefficient matrix.

2. The method for pre-coding according to claim 1, wherein the calculating the pre-coding matrix for each transmitting end according to the sum of mean square errors of the data vectors to be transmitted by each transmitting end comprises:

constructing a corresponding Lagrangian function according to the minimum value of the sum of mean square errors of the data vectors to be transmitted by each transmitting end, or according to the minimum value of the product of the sum of mean square errors of the data vectors to be transmitted by each transmitting end and the weight factor, or according to the minimum value of the sum of or the difference between the sum of mean square errors of the data vectors to be transmitted by each transmitting end and a bias parameter, and a corresponding transmission power constraint of a transmitting end;

according to an optimization condition of the Lagrangian function, obtaining an expression of the pre-coding matrix and an expression of a decoding matrix; and using the expressing of the pre-coding matrix and the expression of the decoding matrix and an initial value of the pre-coding matrix to calculate through iteration to obtain the pre-coding matrix.

3. The method according to claim 2, wherein, the method comprises:

constructing a Lagrangian function as follows according to the minimum value of the sum of mean square errors of the data vectors to be transmitted by each transmitting end and the corresponding transmission power constraint of the transmitting end:

$$L(v_k; R_k; \lambda_k) = \sum_{k=1}^{K} MSE_k + \sum_{k=1}^{K} \lambda_k [tr(v_k^H v_k) - P_k]$$

according to a KKT condition of the Lagrangian function, obtaining the expression of the pre-coding matrix and the expression of the decoding matrix as follows:

$$v_k = \left(\sum_{i=1}^{K} H_{ik}^H R_i^H R_i H_{ik} + \lambda_k I\right)^{-1} H_{kk}^H R_k^H \quad k \in \{1, \cdots, K\}$$

$$R_k = v_k^H H_{kk}^H \left(\sum_{i=1}^{K} H_{ki} v_i v_i^H H_{ki}^H + \sigma_n^2 I\right)^{-1} \quad k \in \{1, \cdots, K\}$$

using the expressing of the pre-coding matrix and the expression of the decoding matrix and an initial value of the pre-coding matrix to calculate through iteration to obtain the pre-coding matrix through iteration;

wherein, $v_k$ is a pre-coding matrix of a transmitting end k, $R_k$ is a decoding matrix of a receiving end k, the transmission power constraint of the transmitting end k is expressed as $P_k = tr(v_k^H v_k)$, $\lambda_k$ is a Lagrangian multiplier corresponding to the transmission power constraint of the transmitting end k, $MSE_k$ is a mean square error of a data vector to be transmitted by the transmitting end k, K represents the number of transmitting ends or receiving ends, k is a sequence number of a transmitting end, $\sigma_n^2$ is a variance of Additive Gaussian White Noise, $H_{ik}$ is a channel coefficient matrix from the transmitting end k to a receiving end i, and i is a sequence number.

4. The method according to claim 2, wherein, the method comprises:

constructing a Lagrangian function as follows according to the minimum value of the sum of mean square errors of the data vectors to be transmitted by each transmitting end and the corresponding transmission power constraint of the transmitting end:

$$L(v_k; R_k; \lambda_k) = \sum_{k=1}^{K} MSE_k \left| \hat{H}_{ij} \right) + \sum_{k=1}^{K} \lambda_k [tr(v_k^H v_k) - P_k]$$

according to a KKT condition of the Lagrangian function, obtaining the expression of the pre-coding matrix and the expression of the decoding matrix as follows:

$$V_k = \left[\sum_{i=1}^{K} \hat{H}_{ik}^H R_i^H R_i \hat{H}_{ik} + \lambda_k I + \sigma_h^2 tr\left(\sum_{i=1}^{K} R_i^H R_i\right) I\right]^{-1} \hat{H}_{kk}^H R_k^H$$

$$R_k = v_k^H \hat{H}_{kk}^H \left(\sum_{i=1}^{K} \hat{H}_{ki} v_i v_i^H \hat{H}_{ki}^H + \sigma_n^2 I + \sigma_h^2 I\right)^{-1}$$

using the expressing of the pre-coding matrix and the expression of the decoding matrix and an initial value of the pre-coding matrix to calculate through iteration to obtain the pre-coding matrix;

wherein, $v_k$ is a pre-coding matrix of a transmitting end k, $R_k$ is a decoding matrix of a receiving end k, the transmission power constraint of the transmitting end k is expressed as $P_k = tr(v_k^H v_k)$, $\lambda_k$ is a Lagrangian multiplier corresponding to the transmission power constraint of the transmitting end k, $MSE_k | \hat{H}_{ij})$ is a mean square error of a data vector to be transmitted by the transmitting end k, an estimated value of a channel coefficient matrix from a transmitting end j to a receiving end i is $\hat{H}_{ij} = H_{ij} + e_{ij}$, $H_{ij}$ is a channel coefficient matrix from the transmitting end j to the receiving end i, $e_{ij}$ is the estimated error of the channel coefficient matrix from the transmitting end j to the receiving end i, K represents the number of transmitting ends or receiving ends, k, i and j are sequence numbers, $\sigma_n^2$ is a variance of Additive Gaussian White Noise, $\sigma_h^2$ is a mean square deviation of a channel estimated error, and $\sigma_h^2$ satisfies $E\{e_{ij} e_{ij}^H\} = \sigma_h^2 I$.

5. The method for pre-coding according to claim 2, wherein the using the expressing of the pre-coding matrix and the expression of the decoding matrix and the initial value of the pre-coding matrix to calculate through iteration to obtain the pre-coding matrix comprises:

according to the initial value of the pre-coding matrix, using the expression of the decoding matrix to calculate each decoding matrix;

using a calculated decoding matrix to calculate to obtain a Lagrangian multiplier of current iteration;

according to the Lagrangian multiplier of the current iteration, updating the pre-coding matrix; and using an updated pre-coding matrix to replace the initial value of the pre-coding matrix, so as to calculate the pre-coding matrix through iteration.

6. The method for pre-coding according to claim 5, wherein the using the updated pre-coding matrix to replace the initial value of the pre-coding matrix, so as to calculate the pre-coding matrix through iteration comprises:

when the number of times of iteration reaches a predetermined value, using a pre-coding matrix obtained in the current iteration as the pre-coding matrix; or when a bound norm of a difference between the pre-coding matrix obtained in the current iteration and a pre-coding matrix obtained in previous iteration is less than a predetermined value, using the pre-coding matrix obtained in the current iteration as the pre-coding matrix; or when an absolute value of a difference between the sum of mean square errors of transmitting ends that is obtained in the current iteration and the sum of mean square errors of the transmitting ends that is obtained in the previous iteration is less than a predetermined value, using the pre-coding matrix obtained in the current iteration as the pre-coding matrix.

7. A method for decoding, comprising:

receiving data from a transmitting end, wherein the data is pre-coded by using a pre-coding matrix; and using a decoding matrix to decode received data, so as to obtain a valid signal;

wherein, the decoding matrix and the pre-coding matrix are obtained by calculating according to a sum of mean square errors of data vectors to be transmitted by each transmitting end, wherein the pre-coding matrix calculation comprises:

calculating the pre-coding matrix for each transmitting end according to a minimum value of the sum of mean square errors of data vectors to be transmitted by each transmitting end; or calculating the pre-coding matrix for each transmitting end according to a minimum value of a product of the sum of mean square errors of data vectors to be transmitted by each transmitting end and a weight factor; or calculating the pre-coding matrix for each transmitting end according to a minimum value of a sum of or a difference between the sum of mean square errors of data vectors to be transmitted by each transmitting end and a bias parameter, the sum of mean square errors of data vectors including an estimated error for a channel coefficient matrix.

8. The method for decoding according to claim 7, wherein the decoding matrix and the pre-coding matrix are obtained by calculating according to a sum of mean square errors of data vectors to be transmitted by each transmitting ends and a corresponding transmission power constraint of a transmitting end, and the decoding matrix has an expression as follows:

$$R_k = v_k^H H_{kk}^H \left( \sum_{i=1}^{K} H_{ki} v_i v_i^H H_{ki}^H + \sigma_n^2 I \right)^{-1} \quad k \in \{1, \cdots, K\}, \text{ or}$$

$$R_k = v_k^H \hat{H}_{kk}^H \left( \sum_{i=1}^{K} \hat{H}_{ki} v_i v_i^H \hat{H}_{ki}^H + \sigma_n^2 I + \sigma_h^2 I \right)^{-1}$$

wherein, $v_k$ is a pre-coding matrix of a transmitting end k, $R_k$ is a decoding matrix of a receiving end k, $H_{ki}$ is a channel coefficient matrix from a transmitting end i to the receiving end k, $\hat{H}_{ki}$ is an estimated value of the channel coefficient matrix from the transmitting end i to the receiving end k, $\sigma_n^2$ is a variance of Additive Gaussian White Noise, $\sigma_h^2$ is a mean square deviation of a channel estimated error, $\sigma_h^2$ satisfies $E\{e_{ij} e_{ij}^H\} = \sigma_h^2 I$, and i is a sequence number.

9. A device for pre-coding, comprising:

a calculation unit, configured to calculate a pre-coding matrix for each transmitting end according to a sum of mean square errors of data vectors to be transmitted by each transmitting end; and a pre-coding unit, configured to use the pre-coding matrix obtained by the calculation unit to pre-code data to be transmitted by each transmitting end, wherein the calculation unit is configured to:

calculate the pre-coding matrix for each transmitting end according to a minimum value of the sum of mean square errors of data vectors to be transmitted by each transmitting end; or calculate the pre-coding matrix for each transmitting end according to a minimum value of a product of the sum of mean square errors of data vectors to be transmitted by each transmitting end and a weight factor; or calculate the pre-coding matrix for each transmitting end according to a minimum value of a sum of or a difference between the sum of mean square errors of data vectors to be transmitted by each transmitting end and a bias parameter, the sum of mean square errors of data vectors including an estimated error for a channel coefficient matrix.

10. The device for pre-coding according to claim 9, wherein, the calculation unit comprises:

an expression acquisition module, configured to construct a corresponding Lagrangian function according to the minimum value of the sum of mean square errors of the data vectors to be transmitted by each transmitting end, or according to the minimum value of the product of the sum of mean square errors of the data vectors to be transmitted by each transmitting end and a weight factor, or according to a minimum value of a sum of or a difference between the sum of mean square errors of the data vectors to be transmitted by each transmitting end and a bias parameter, and a corresponding transmission power constraint of a transmitting end; and obtain an expression of the pre-coding matrix and an expression of the decoding matrix according to an optimization condition of the Lagrangian function; and an iteration module, configured to, by using the expression of the pre-coding matrix and the expression of the decoding matrix that are obtained by the expression acquisition module and an initial value of the pre-coding matrix, calculate through iteration to obtain the pre-coding matrix.

11. The device for pre-coding according to claim 9, wherein, the expression acquisition module is configured to construct a Lagrangian function as follows according to the minimum value of the sum of mean square errors of the data vectors to be transmitted by each transmitting end and a corresponding transmission power constraint of a transmitting end:

$$L(v_k; R_k; \lambda_k) = \sum_{k=1}^{K} MSE_k + \sum_{k=1}^{K} \lambda_k [tr(v_k^H v_k) - P_k]$$

according to a KKT condition of the Lagrangian function, an expression of the pre-coding matrix and an expression of the decoding matrix as follows are obtained:

$$v_k = \left(\sum_{i=1}^{K} H_{ik}^H R_i^H R_i H_{ik} + \lambda_k I\right)^{-1} H_{kk}^H R_k^H \quad k \in \{1, \cdots, K\}$$

$$R_k = v_k^H H_{kk}^H \left(\sum_{i=1}^{K} H_{ki} v_i v_i^H H_{ki}^H + \sigma_n^2 I\right)^{-1} \quad k \in \{1, \cdots, K\},$$

or, the expression acquisition module is configured to construct a Lagrangian function as follows according to the minimum value of the sum of mean square errors of the data vectors to be transmitted by each transmitting end and the corresponding transmission power constraint of the transmitting end:

$$L(v_k; R_k; \lambda_k) = \sum_{k=1}^{K} MSE_k \left| \hat{H}_{ij} \right) + \sum_{k=1}^{K} \lambda_k [tr(v_k^H v_k) - P_k]$$

according to the KKT condition of the Lagrangian function, the expression of the pre-coding matrix and the expression of the decoding matrix as follows are obtained:

$$v_k = \left[\sum_{i=1}^{K} \hat{H}_{ik}^H R_i^H R_i \hat{H}_{ik} + \lambda_k I + \sigma_h^2 tr\left(\sum_{i=1}^{K} R_i^H R_i\right) I\right]^{-1} \hat{H}_{kk}^H R_k^H$$

$$R_k = v_k^H \hat{H}_{kk}^H \left(\sum_{i=1}^{K} \hat{H}_{ki} v_i v_i^H \hat{H}_{ki}^H + \sigma_n^2 I + \sigma_h^2 I\right)^{-1}$$

wherein, $v_k$ is a pre-coding matrix of a transmitting end k, $R_k$ is a decoding matrix of a receiving end k, the transmission power constraint of the transmitting end k is expressed as $P_k = tr(v_k^H v_k)$, $\lambda_k$ is a Lagrangian multiplier corresponding to the transmission power constraint of the transmitting end k, $MSE_k$ is a mean square error of a data vector to be transmitted by the transmitting k, $MSE_k|\hat{H}_{ij})$ is a mean square error of a data vector to be transmitted by the transmitting end k, $\hat{H}_{ij} = H_{ij} + e$ is the estimated value of a channel coefficient matrix from a transmitting end j to a receiving end i, $H_{ij}$ is a channel coefficient matrix from the transmitting end j to the receiving end i, $e_{ij}$ is an estimated error of the channel coefficient matrix from the transmitting end j to the receiving end i, $\sigma_n^2$ is a variance of Additive Gaussian White Noise, $\sigma_h^2$ is a mean square deviation of a channel estimated error, $\sigma_h^2$ satisfies $E\{e_{ij}e_{ij}^H\} \gamma \sigma_h^2 I$, K represents the number of transmitting ends or receiving ends, and k, i and j are sequence numbers.

12. The device for pre-coding according to claim 9, wherein,
the iteration module is configured to: according to an initial value of the pre-coding matrix, use the expression of the decoding matrix to calculate each decoding matrix; use a calculated decoding matrix to calculate to obtain a Lagrangian multiplier of the current iteration; update the pre-coding matrix according to the Lagrangian multiplier of current iteration; replace the initial value of the pre-coding matrix with an updated pre-coding matrix, and calculate the pre-coding matrix through iteration.

13. A device for decoding, comprising:
a receiving unit, configured to receive data from a transmitting end, wherein the data is pre-coded by using a pre-coding matrix; and
a decoding unit, configured to use a decoding matrix to decoding data received by the receiving unit, so as to obtain a valid signal, wherein the pre-coding matrix and the decoding matrix are obtained by calculating according to a sum of mean square errors of data vectors to be transmitted by each transmitting end,
wherein the pre-coding matrix calculation is obtained by:
calculating the pre-coding matrix for each transmitting end according to a minimum value of the sum of mean square errors of data vectors to be transmitted by each transmitting end; or
calculating the pre-coding matrix for each transmitting end according to a minimum value of a product of the sum of mean square errors of data vectors to be transmitted by each transmitting end and a weight factor; or
calculating the pre-coding matrix for each transmitting end according to a minimum value of a sum of or a difference between the sum of mean square errors of data vectors to be transmitted by each transmitting end and a bias parameter,
the sum of mean square errors of data vectors including an estimated error for a channel coefficient matrix.

14. The device for decoding according to claim 13, wherein the decoding matrix and the pre-coding matrix are obtained through calculation according to a minimum value of the sum of mean square errors of the data vectors to be transmitted by each transmitting end and a corresponding transmission power constraint of a transmitting end, the decoding unit is configured to use a decoding matrix having an expression as follows to decode the data received by the receiving unit, so as to obtain the valid signal:

$$R_k = v_k^H H_{kk}^H \left(\sum_{i=1}^{K} H_{ki} v_i v_i^H H_{ki}^H + \sigma_n^2 I\right)^{-1} \quad k \in \{1, \cdots, K\}, \text{ or}$$

$$R_k = v_k^H \hat{H}_{kk}^H \left(\sum_{i=1}^{K} \hat{H}_{ki} v_i v_i^H \hat{H}_{ki}^H + \sigma_n^2 I + \sigma_h^2 I\right)^{-1}$$

wherein, $v_k$ is a pre-coding matrix of a transmitting end k, $R_k$ is a decoding matrix of a receiving end k, $H_{ki}$ is a channel coefficient matrix from a transmitting end i to the receiving end k, $\hat{H}_{ki}$ is an estimated value of a channel coefficient matrix from the transmitting end i to the receiving end k, $\sigma_n^2$ is a variance of Additive Gaussian White Noise, $\sigma_h^2$ is a mean square deviation of a channel estimated error, $\sigma_h^2$ satisfies $E\{e_{ij}e_{ij}^H\} = \sigma_h^2 I$, and i is a sequence number.

* * * * *